3,850,906
NOVEL Δ⁴/Δ⁵-DEHYDROCARDENOLIDES AS WELL AS PROCESS FOR THEIR PREPARATION

Johannes Herrmann Hartenstein, Wittental, Germany, assignor to Warner-Lambert Company, Morris Plains, N.J.
No Drawing. Filed Nov. 15, 1972, Ser. No. 306,640
Int. Cl. C07c $173/02$
U.S. Cl. 260—210.5    7 Claims

ABSTRACT OF THE DISCLOSURE

The present invention relates to $\Delta^4/\Delta^5$-dehydrocardenolides of the formula I

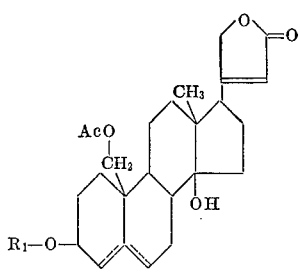

wherein $R_1$ may be a tetrahydropyranosyl- or glycosyl residue either of which may be substituted; Ac represents an acetyl residue, and the dotted lines denote a double bond between either C-atoms 4 and 5 or 5 and 6 and to a process for their preparation. The compounds of the present invention are useful as intermediates for the manufacture of cario- and vascular-active steroids and as positive inotropic agents.

---

The process of the present invention for preparing the compounds of formula I

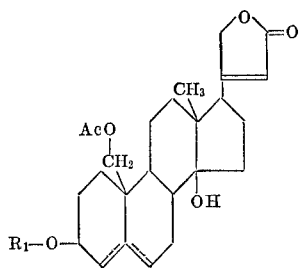

is characterized by the fact that compounds of formula II

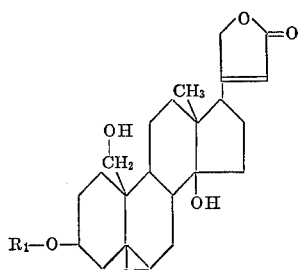

wherein $R_1$ may be a tetrahydropyranosyl- or glycosyl residue, either of which may be substituted; Ac represents an acetyl residue, and the dotted lines denote a double bond between either C-atoms 4 and 5 or 5 and 6, are reacted with an equivalent amount or excess amounts of a trialkyl orthoacetate in an inert organic solvent in the presence of an acid catalyst at temperatures between 0° and the boiling temperature of the reaction mixture, preferably at room temperature. If the residue $R_1$ has suitable functional groups and if desired these groups subsequently ketalized and/or alkylated and/or acylated according to previously known methods, or if, the residue $R_1$ has such groups the acetate groups are subsequently saponified by treatment with methanolic-aqueous $KHCO_3$ solution or with methanolic ammonia.

The glycosides with $\Delta^4$-dehydro-aglycon (scillarenin, scilliglaucosidin) hold a central position among the naturally occurring and therapeutically useful bufadienolides, while the $\Delta^4$- or $\Delta^5$-aglycons are relatively rare among the carenolide glycosides. Examples are the glycosides of canarigenin ($\Delta^4$), xysmalogenin ($\Delta^5$), securigenin ($\Delta^4$), and pachygenin ($\Delta^5$). The selective synthesis of $\Delta^4$- and $\Delta^5$-dehydrocardenolide glycosides from the corresponding $5\beta$-hydroxycardenolides fails due to the fact that the usual dehydrating reagents lead predominantly to the elimination of the C–14 hydroxyl group, which in most cases causes the compound to lose its cardiotonic effect.

It is known from the literature that orthoesters form cyclic orthoesters with acyclic and cyclic 1,2- and 1,3-diols by an acid-catalyzed transesterification process. By partial hydrolysis monoacyl derivatives may be prepared from them. In the case of orthoesters of 1,3-diols, containing a primary as well as a tertiary hydroxyl group, the acyl derivatives of the tertiary hydroxyl group are usually formed [cf. E. Shapiro et al., Steroids 9, 143 (1967)]. Surprisingly, it has now been found that in the reaction of trialkyl orthoacetates with cardenolides having hydroxyl groups at C–$5\beta$ and C–19 in the presence of an acid catalyst at room temperature, the orthoacetates cannot be isolated but rearrange directly into a mixture of $\Delta^4$- and $\Delta^5$-dehydrocardenolides, in which the $\Delta^4$-isomer predominates ($\Delta^{4:5} \approx 3:1$). The mixtures can be used as such or can be separated into their components by chromatography and/or fractional crystallization.

The structural elucidation of the products obtained according to the process was effected by means of elementary and spectrometric analyses as well as by chemical degradation. Proton resonance spectroscopy was used for structural assignment of the $\Delta^4$- and $\Delta^5$-dehydro-isomers in the spectrum of the $\Delta^4$-isomers the signal of the vinyl proton at C–4 appears as a narrow multiplet $$(\nu\ \tfrac{1}{2}\ 4\text{--}5\ Hz),$$

in the $\Delta^5$-isomer, however, the signal of the vinyl proton at C–6 appears as a broad multiplet ($\nu\ \tfrac{1}{2}\ 9\text{--}10\ Hz$). The values of the chemical shifts of the charartecristic proton signals ($\delta$ in p.p.m.), for some of the examples, are summarized in Table I.

TABLE 1.—NMR-DATA OF EXAMPLES 1-5

| Example No. | Position of the double bond | H-4 (multiplet) | H-6 (multiplet) | H-21 (multiplet) | H-22 (multiplet) | 19-OAc (singlet) |
|---|---|---|---|---|---|---|
| 1 | $\Delta^4+\Delta^5$ | 5.54 | 5.61 | 5.83 | 4.86 | 2.01, 2.00 |
| 2 | $\Delta^4+\Delta^5$ | 5.61 | 5.66 | 5.89 | 4.90 | 2.00, 1.98 |
| 3 | $\Delta^4+\Delta^5$ | 5.60 | 4.66 | 5.91 | 4.91 | 2.00 |
| 4a | $\Delta^5$ | | 5.62 | 5.86 | 4.86 | 2.02 |
| 4b | $\Delta^4$ | 5.56 | | 5.86 | 4.89 | 2.00 |
| 5 [1] | $\Delta^4$ | 5.48 | | 5.90 | 4.90 | 1.98 |

[1] In DMSO-d₆; all other spectra in CDCl₃

In carrying out the reaction a suitable 5β,14β,19-trihydroxy-cardenolide is dissolved in an inert solvent such as, for example, ether, dioxane, tetrahydrofuran or dimethylformamide and is mixed with an equivalent amount or excess amounts of trialkyl orthoacetate and catalytic amounts of an acid sufficiently strong to induce the transformation. Suitable acid catalysts are inorganic or organic acids such as, for example, etheral hydrochloric acid, sulfuric acid, 70% perchloric acid, p-toluene-sulfonic acid, methanesulfonic acid, or sulfonic acids in the form of ion exchange resins. The concentration is chosen to be such that elimination of the C-14 hydroxyl group and/or splitting off of potential acid-sensitive residue $R_1$, particularly 2'-deoxyglycosyl residue, is avoided. It is advisable to use an acid concentration of 0.1 to 1%, preferably 0.5%. Specifically, p-toluenesulfonic acid, in particular, is used in a concentration of 1–10%, relative to the steroid. The reaction according to the invention is performed at temperatures between 0° and the boiling temperature of the reaction mixture, preferably at room temperature. At this temperature the transformation, usually proceeds essentially to completion in a few minutes, as indicated by thin-layer-chromatographic monitoring the reaction.

The reaction mixture is processed in the usual manner by neutralization with aqueous sodium bicarbonate or sodium carbonate solution and extraction with an organic solvent. The products obtained by this process may be isolated by means of chromatography on, for example, silica gel or aluminum oxide, and/or direct crystallization.

The compounds of the general formula II used in the reaction according to the invention are obtained from the corresponding 10-formyl compounds according to methods known in the literature [cf., for example, A. Hunger, T. Reichstein, Helv. 85, 635 (1952)] by reduction with complex metal hydrides, such as, for example, sodium borohydride or lithium-tri-tert, butoxyaluminumhydride in an inert organic solvent. Almost all of the corresponding 5β-hydroxycardenolides are suitable as the 10-formyl compounds. Suitable are, for example, 2'-tetrahydropyranosyl strophanthidin, naturally occuring glycosides such as cymarin, helveticoside, convallatoxin, strophanthidinglucopyranoside, as well as, synthetic strophanthidin glycosides. The hydroxyl groups of the sugar residue may be alkylated, acylated, or ketalized, if necessary.

In carrying out the reaction according to the invention a monoacetylation of the sugar residue occurs simultaneously via the intermediary formation of orthoesters and subsequent partial hydrolysis, whereby the acetates with axial acetoxy groups are formed selectively if 1,2-cis-diol groupings are present in the residue $R_1$ of general formula II as, for example, in helveticosol or convallatoxol.

In those cases in which the hydroxyl groups of the residue $R_1$ of general formula I, protected by acetylation, are to be liberated, the product of the process can be subsequently saponified by treating it with potassium bicarbonate in aqeols methanol or with ammonia in alcohol. An unexpected result of this process is the fact that under the stated usual conditions for deacetylation the 19-acetoxy group is not affected, even though it is a primary acetyl group without obvious steric hindrance obvious from the molecular model.

The compounds of formula I, prepared according to the invention, may be subsequently alkylated, acylated or ketalized, if they possess suitable functional groups, and if required.

The compounds obtained according to the process described above have valuable pharmacologic properties and are in addition important as intermediates for the manufacture of cardio- and vascular-active steroids. They exert a positive inotropic effect on the heart muscle of various mammals and possess an increased enteral effectiveness compared with the corresponding 5β,19-dihydroxycardenolides. For the treatment of cardiac or circulatory diseases they can be applied in forms suitable for oral or injection preparations. For this purpose they are processed with carriers and adjuvants usual in galenic pharmaceutics and subsequently formed in a manner known in principle into the administration form required. Suitable administration forms are tablets, coated tablets, capsules, suppositories, drops and ampules. Quantity and frequency of dosage depend on the severity of the case to be treated; 0.1 to 1.0 mg. of active ingredient are recommended as the dose.

The following examples serve to illustrate the manufacturing process of the compounds according to the invention, but they are not intended to limit it thereto.

EXAMPLE 1

$\Delta^4/\Delta^5$-Anhydrocymarol-19-O-acetate 1 ml. of triethyl orthoacetate and 100 mg. of p-toluenesulfonic acid are added to a solution of 380 mg. of cymarol in 9 ml. of abs. dioxane. The mixture is stirred for 20 minutes at room temperature, mixed with 50 ml. of 5% aqueous sodium bicarbonate solution, and exhaustively extracted with chloroform. After drying and evaporation under reduced pressure the residue is chromatographed on silica gel. Elution with chloroform yields 330 mg. of a mixture of $\Delta^4$- and $\Delta^5$-anhydrocymarol-19-O-acetate as a white foam which is reprecipitated from chloroform/ethyl acetate with hexane, m.p. 98–102° C.

$\lambda_{max}$ (EtOH) 215 nm. (17700). IR (KBr): inter alia 1780, 1732, 1620, 1370, 1240, 1085 cm.$^{-1}$.

$C_{32}H_{46}O_9 \cdot \frac{1}{2}H_2O$.—Calc. (percent): C, 65.85; H, 8.12; O, 26.04. Found (percent): C, 65.83; H, 8.02; O, 26.16.

EXAMPLE 2

4'-O-Acetyl-$\Delta^4/\Delta^5$-anhydro-cymarol-19-acetate 1.1 g. of cymarol in 18 ml. of dioxane are reacted with 2 ml. of triethyl orthoacetate and 70 mg. of p-toluene sulfonic acid and processed as described in Example 1. The residue is dissolved in 20 ml. of pyridine and 15 ml. of acetic anhydride. The mixture is allowed to stand at room temperature for 18 hours, subsequently poured into ice water and exhaustively extracted with chloroform. Processing in the usual manner yields 1.468 g. of crude product which is chromatographed on silica gel with chloroform as eluent. After reprecipitation from benzene/ice water and eshaustively extracted with chloroform. hexane 900 mg. of a mixture of $\Delta^4$-and $\Delta^5$-anhydrocymarol-4,19-O-diacetate as an amorphous powder are obtained, m.p. 98–100° C.

$\lambda_{max}$ (EtOH) 215 nm. (15500); IR (KBr): inter alia 1780, 1733, 1620, 1371, 1238, 1093, 1060 cm.$^{-1}$.

$C_{34}H_{48}O_{10} \cdot \frac{1}{2}H_2O$.—Calc. (percent): C, 65.27; H, 7.89; O, 26.85. Found (percent): C, 65.18; H, 7.75; O, 26.84.

EXAMPLE 3

3',4'-O-Diacetyl-$\Delta^4/\Delta^5$-anhydrohelveticosol-19-O-acetate 752 mg. of 3',4'-O-diacetylhelveticosol are dissolved in 9 ml. of abs. dioxane and mixed with 1.2 ml. of triethyl orthoacetate and 50 mg of p-toluenesulfonic acid monohydrate. The reaction mixture is stirred at room temperature for 25 minutes, subsequently neutralized with 5% aqueous sodium bicarbonate solution and exhaustively extracted with chloroform/methanol (9:1, v./v.). Processing the extract in the usual manner yields, following chromatography on silica gel, 688 mg. of product as a colorless foam which is reprecipitated from ether with hexane. The white amorphous powder so obtained sinters from 90° C.

$\lambda_{max}$ (EtOH) 215 nm. (18900); IR (KBr): inter alia 1780, 1742, 1732, 1620, 1370, 1246, 1230, 1055, 1023.

$C_{35}H_{48}O_{11} \cdot H_2O$.—Calc. (percent): C, 63.43; H, 7.60; O, 28.97. Found (percent): C, 63.66; H, 7.75; O, 28.69.

EXAMPLE 4

2',3',4' - O - Triacetyl - $\Delta^5$ - anhydroconvallatoxol - 19 - O-acetate (a) and -$\Delta^4$ - anhydroconvallatoxol - 19 - O-acetate (b)

(a) 1.89 g. of convallatoxol triacetate in 20 ml. of abs. dioxane are mixed with 2 ml. of triethyl orthoacetate and 100 mg. of p-toluenesulfonic acid with stirring at room temperature. After 30 minutes the mixture is neutralized with 5% sodium bicarbonate solution and exhaustively extracted with chloroform. After drying and evaporation under reduced pressure a yellowish-white foam is obtained which is dissolved in a small amount of acetone. Addition of ether gave 352 mg. of crystalline triacetyl-$\Delta^5$-anhydro-convallatoxol-19-acetate, crystallized, m.p. 244–246° C.

$\lambda_{max}$ (EtOH) 215 nm. (17000); IR (KBr): inter alia 1780, 1740, 1731, 1622, 1371, 1250, 1225, 1075, 1043.

$C_{37}H_{50}O_{13}$.—Calc. (percent): C, 63.23; H, 7.17; O, 29.60. Found (percent): C, 63.08; H, 7.05; O, 29.90.

(b) The residue from the mother liquor is purified by chromatography on silica gel (eluent: chloroform/methanol 99:1–99:2, v./v.). 1.171 g. of triacetyl-$\Delta^4$-anhydro-convallatoxol - 19 - acetate are obtained. Reprecipitation from acetone with ether/petroleum ether yields a white amorphous powder, m.p. 115° C.

$\lambda_{max}$ (EtOH) 215 nm. (19200); IR (KBr): inter alia 1773, 1740, 1731, 1620, 1370, 1243, 1225, 1075, 1043.

$C_{37}H_{50}O_{13}$.—Calc. (percent): C, 63.23; H, 7.17; O, 29.60. Found (percent): C, 63.10; H, 6.91; O, 29.76%.

EXAMPLE 5

$\Delta^4$-5-Monoanhydroconvallatoxol-19-O-acetate 1.17 g. of triacetyl - $\Delta^4$ - 5 - monoanhydroconvallatoxol-19-O-acetate are dissolved in 30 ml. of methanol and mixed with 15 ml. of methanolic ammonia saturated at room temperature. The mixture is allowed to stand at room temperature for 1.5 hours, evaporated to dryness, and crystallized from tetrahydrofuran/water, 461 mg. of product are obtained, m.p. 138–140° C.

$\lambda_{max}$ (EtOH) 215 nm. (18000); IR (KBr): inter alia 1780, 1733, 1620, 1385, 1242, 1045 cm.$^{-1}$.

$C_{31}H_{44}O_{10} \cdot \frac{1}{2}H_2O$.—Calc. (percent): C, 63.57; H, 7.74; O, 28.68. Found (percent): C, 63.70; H, 7.49; O, 28.61.

EXAMPLE 6

$\Delta^5$-5-Monoanhydroconvallatoxol-19-O-acetate 250 mg. of triacetyl - $\Delta^5$ - monoanhydroconvallatoxol-19-O-acetate (cf. Example 4a) are dissolved in 10 ml. of methanol and mixed with 5 ml. of saturated methanolic ammonia. The mixture is allowed to stand at room temperature for 18 hours, is evaporated to dryness under reduced pressure and the residue is chromatographed on silica gel. Elution with chloroform/methanol (95:5, v./v.) yields 228 mg. of product which crystallizes from tetrahydrofuran/water, m.p. 152–155° C.

$\lambda_{max}$ (EtOH) 215 nm. (17000); IR (KBr): inter alia 1780, 1732, 1620, 1240, 1045 cm.$^{-1}$.

NMR (in DMSO·$d_6$, $\delta$ in p.p.m.): 1.99 (s, 3H), 4.91 (m, 2H), 5.61 (m, 1H), 5.89 (m, 1H).

$C_{31}H_{44}O_{10} \cdot 1H_2O$.—Calc. (percent): C, 61.61; H. 7.80. Found (percent): C, 61.91; H, 7.80.

I claim:

1. A process for preparing compounds of the formula

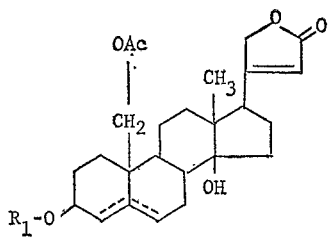

which consists essentially of mixing compounds of the formula II

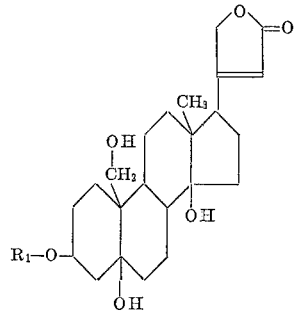

wherein $R_1$ is 2 - tetrahydropyranosyl, digitoxosyl, cymarosyl, rhamnosyl or strophanthobiosyl; Ac is acetyl and the dotted line denotes a 4,5- or 5,6- double bond, with equivalent or excess amounts of a trialkyl orthoacetate in the presence of an acid catalyst selected from the group consisting of hydrochloric acid, sulfuric acid, perchloric acid, p-toluene-sulfonic acid, methane sulfonic acid, and sulfonic acids in the form ion exchange resins at a temperature between 0° and the boiling point of the reaction mixture in an inert organic solvent to form compounds of formula III

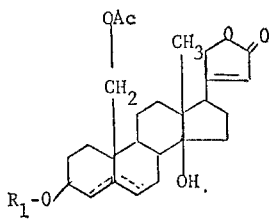

wherein Ac is acetyl; $R_1$ is 2 - tetrahydropyranosyl; O-acetyldigitoxosyl, O - acetylcymarosyl, O,O,O - triacetyl-rhamnosyl or O,O,O,O - tetracetylstrophanthobiosyl and the dotted line denotes a 4,5- or 5,6- double bond and hydrolyzing the acetate groups of the sugar moieties of compounds of formula III, wherein Ac and $R_1$ are as hereinbefore defined, with base selected from the group consisting of potassium bicarbonate and ammonia.

2. A process according to claim 1 in which the acid concentration is 0.1 to 1%.

3. A process according to claim 1 in which the acid catalyst is p-toluenesulfonic acid.

4. A process according to claim 3 in which the concentration of p-toluenesulfonic acid is 1 to 10% of the weight of the steroid.

5. A process according to claim 1 in which the reaction temperature is room temperature.

6. A process according to claim 1 in which the base is methanolic-aqueous potassium bicarbonate.

7. A process according to claim 1 in which the base is methanolic ammonia.

References Cited

UNITED STATES PATENTS

| | | | |
|---|---|---|---|
| 3,177,200 | 4/1965 | Meyer | 260—239.57 |
| 3,462,528 | 8/1969 | Voigtlander et al. | 260—210.5 |
| 3,471,470 | 10/1969 | Heider et al. | 260—210.5 |
| 3,732,203 | 5/1973 | Stache et al. | 260—210.5 |

JOHNNIE R. BROWN, Primary Examiner

C. B. OWENS, Assistant Examiner

U.S. Cl. X.R.

424—182